United States Patent
Park et al.

(10) Patent No.: US 10,256,754 B2
(45) Date of Patent: Apr. 9, 2019

(54) APPARATUS AND METHOD FOR COMPENSATING FOR POSITION ERROR OF RESOLVER

(71) Applicants: HYUNDAI MOTOR COMPANY, Seoul (KR); KIA MOTORS CORPORATION, Seoul (KR)

(72) Inventors: Joo Young Park, Yongin-si (KR); Ho Joon Shin, Suwon-si (KR); Jun Mo An, Hwaseong-si (KR); Sung Kyu Kim, Bucheon-si (KR); Su Hyun Bae, Daegu (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/830,726

(22) Filed: Dec. 4, 2017

(65) Prior Publication Data

US 2019/0058422 A1  Feb. 21, 2019

(30) Foreign Application Priority Data

Aug. 16, 2017  (KR) .................. 10-2017-0103466

(51) Int. Cl.

| | |
|---|---|
| *G01D 5/14* | (2006.01) |
| *H02P 6/16* | (2016.01) |
| *H02P 6/15* | (2016.01) |
| *G01D 5/244* | (2006.01) |
| *H02K 11/225* | (2016.01) |
| *H02P 6/17* | (2016.01) |
| *G01P 3/44* | (2006.01) |

(52) U.S. Cl.
CPC ......... *H02P 6/153* (2016.02); *G01D 5/24485* (2013.01); *G01P 3/44* (2013.01); *H02K 11/225* (2016.01); *H02P 6/17* (2016.02)

(58) Field of Classification Search
CPC ...................................................... G01D 5/14
See application file for complete search history.

(56) References Cited

U.S. PATENT DOCUMENTS

| | | | |
|---|---|---|---|
| 2012/0143549 A1* | 6/2012 | Ihm ....................... | G01B 21/00 702/94 |
| 2016/0109269 A1* | 4/2016 | Park ..................... | G01D 5/2449 702/94 |
| 2017/0174085 A1* | 6/2017 | Rozman ................. | B60L 11/06 |

FOREIGN PATENT DOCUMENTS

KR  2012-0059956 A  6/2012

* cited by examiner

*Primary Examiner* — Bentsu Ro
(74) *Attorney, Agent, or Firm* — Morgan Lewis & Bockius LLP

(57) ABSTRACT

An apparatus for compensating for a position error of a resolver has a controller which is configured to: receive position information of a rotor of a motor, which is detected by the resolver, to measure a first position error, convert the first position error to a second position error at an electrical angular velocity of 0, and to store the second position error; receive a current electrical angular velocity and the second position error, convert the second position error to a third position error at the current electrical angular velocity, and compensate for the third position error; and perform determination of false position error compensation when a magnitude of a ripple at an electrical angular velocity, which is measured after the third position error has been compensated for, is equal to or greater than a reference magnitude.

13 Claims, 3 Drawing Sheets

APPARATUS AND METHOD FOR COMPENSATING FOR POSITION ERROR OF RESOLVER

CROSS REFERENCE TO RELATED APPLICATION

The present application claims the benefit of priority to Korean Patent Application No. 10-2017-0103466 filed on Aug. 16, 2017, the entire content of which is incorporated herein for all purposes by this reference.

TECHNICAL FIELD

The present disclosure relates to an apparatus and method for compensating for a position error of a resolver, and more particularly, to an apparatus and method for compensating for a position error of a resolver, which can compensate for a position error in a full speed range on the basis of a position error measured at a specific speed and determine the possibility of false compensation for a current position error through the diagnosis of position error components after performing compensation, thereby improving reliability and stability.

BACKGROUND

When a permanent magnet synchronous motor is driven by vector control, accurate position information of a rotor thereof is required. A resolver may be used to recognize the absolute position of the rotor. However, an unbalance of a magnitude of a signal may occur due to a difference in transformation ratios of the resolver, unbalanced excitation signals, non-uniform inductance components, and distortion from a signal-processing circuit, and thus error components may periodically occur in the position information. Therefore, motor control performance is deteriorated, and thus, the use of motor in fields requiring high performance is limited.

Since such an error component may periodically occur, it can be expressed as sine or cosine function having an arbitrary magnitude and phase as follows.

$$N\text{th position error} = \text{Magnitude} \ast \text{Cos}(N w t - \text{Phase})$$

Here, in the criterion for sorting orders based on the electrical angle, an electrical angle of 0 to 2 pi is counted as one period.

Conventionally, a method for compensating for position error of a resolver using an RLS adaptive filter is provided, but is limited in its ability to provide compensation for a position error throughout a full speed range.

Further, conventional methods for compensating for position error cannot diagnose position error corresponding to the case where a false position error of the resolver is learned due to intermittent signal abnormality, vehicle vibration, and the like. Therefore, the reliability of the position error compensation apparatus cannot be guaranteed.

Therefore, there is a need for a solution that can diagnose the possibility of false compensation for the current position error so as to improve the reliability and stability of the position error compensation apparatus.

The above description in this background section is only for improving understanding of the background of the present disclosure, and should not be taken as an acknowledgement indicating that the information forms a prior art that is already known to a person skilled in the art.

SUMMARY

The present disclosure has been made in order to solve the above-mentioned problems in the prior art, and an aspect of the present disclosure is to provide an apparatus and method for compensating for a position error of a resolver, which can compensate for position error in a full speed range on the basis of a position error measured at a specific speed and determine the possibility of false compensation for a current position error through the diagnosis of position error components after performing compensation, thereby improving reliability and stability.

An apparatus for compensating for a position error of a resolver according to the present disclosure includes a controller configured to: receive position information of a rotor of a motor, which is detected by a resolver, to measure a first position error, convert the first position error to a second position error at an electrical angular velocity of 0, and store the converted position error; receive a current electrical angular velocity and the position error, convert to a third position error at the current electrical angular velocity, and compensate for the third position error; and perform a determination of false compensation of the third position error when the magnitude of a ripple at an electrical angular velocity, which is measured after the third position error has been compensated for, is equal to or greater than a reference magnitude.

The controller is further configured to receive position information of the rotor of the motor, which is detected by the resolver, to measure a position error; determine the electrical angular velocity of the position error; convert the position error to a position error at an electrical angular velocity of 0, on the basis of information which is derived by configuring the electrical angular velocity, as a previously prepared and stored mapping data input, and the position error; and store the position error.

The controller further determines a current electrical angular velocity; and receives the current electrical angular velocity and the position error, and performs conversion to a position error at the current electrical angular velocity.

The controller further measures an electrical angular velocity after the position error compensation is performed; calculates a filter coefficient according to the electrical angular velocity measured; extracts a ripple at the electrical angular velocity; and makes a determination of the false position error compensation when the magnitude of the extracted ripple is equal to or greater than a reference magnitude.

When a determination of false position error compensation is made, the controller initializes the position error, or re-performs a process of converting the position error to a position error at an electrical angular velocity of 0 and storing the converted position error.

An apparatus for compensating for a position error of a resolver according to the present disclosure includes a controller configured to: receive position information of a rotor of a motor, which is detected by a resolver, to measure a position error, converts the measured position error to a position error at an electrical angular velocity of 0, and stores the converted position error; receive a current electrical angular velocity and a position error, performs conversion to a position error at the current electrical angular velocity, and compensates for the converted position error; and makes a determination of false compensation for the position error when the root mean square (rms) value of a ripple at an electrical angular velocity, which is measured after the position error has been compensated for, is equal to or greater than a predetermined reference value.

When a determination of false position error compensation is made, the controller initializes the position error, or re-performs a process of converting the position to a position error at an electrical angular velocity of 0 and storing the converted position error.

The apparatus further includes a resolver digital converter that performs digital conversion of the position information of the rotor of the motor, which is measured by the resolver, and outputs the digitally converted position information.

A method for compensating for a position error of a resolver according to the present disclosure includes: measuring position information of a rotor of a motor, receiving the measured position information of the rotor of the motor to measure a position error, converting the measured position error to a position error at an electrical angular velocity of 0, and storing the converted position error; receiving a current electrical angular velocity and the stored position error, performing conversion to a position error at the current electrical angular velocity, and compensating for the converted position error; and making a determination of false position error compensation when a magnitude of a ripple at an electrical angular velocity, which is measured after the position error has been compensated for, is equal to or greater than a predetermined reference magnitude.

A method for compensating for a position error of a resolver according to the present disclosure includes: measuring position information of a rotor of a motor, receiving the measured position information of the rotor of the motor to measure a position error, converting the measured position error to a position error at an electrical angular velocity of 0, and storing the converted position error; receiving a current electrical angular velocity and the stored position error, performing conversion to a position error at the current electrical angular velocity, and compensating for the converted position error; and making a determination of false position error compensation when the root mean square value of a ripple at an electrical angular velocity, which is measured after the position error has been compensated for, is equal to or greater than a predetermined reference value.

Making the determination of false position error compensation further includes, when a determination of false position error compensation is made, initializing the stored position error or re-performing a process of converting the position error to a position error at an electrical angular velocity of 0 and storing the converted position error.

According to the apparatus and method for compensating for a position error of a resolver of the present disclosure, it is possible to compensate for a position error in a full speed range on the basis of a position error measured at a specific speed and determine the possibility of false compensation for a current position error through the diagnosis of position error components after performing compensation, thereby improving reliability and stability.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, an apparatus and method for compensating for a position error of a resolver according to various embodiments of the present disclosure will be described with reference to the accompanying illustrative drawings.

Figure 1:
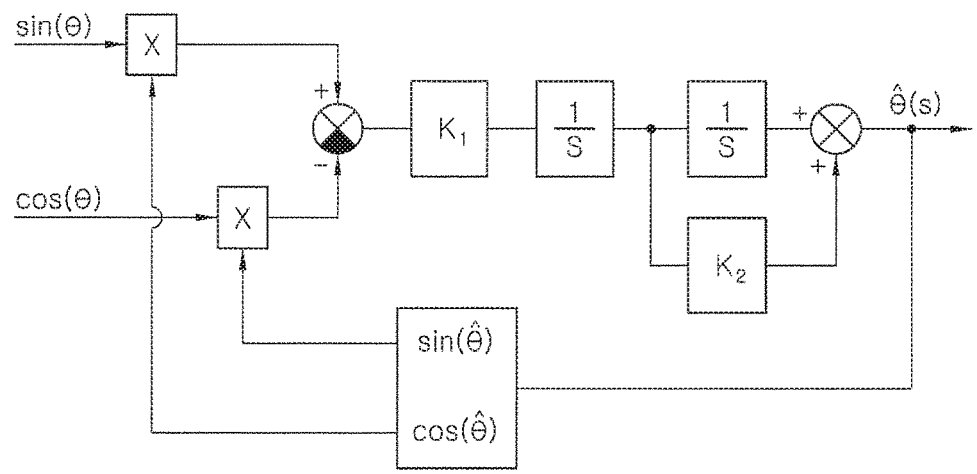
FIG. 1 is a block diagram of an Angle Tracking Observer (ATO) included in a resolver digital converter according to an embodiment of the present disclosure.
Figure 2:
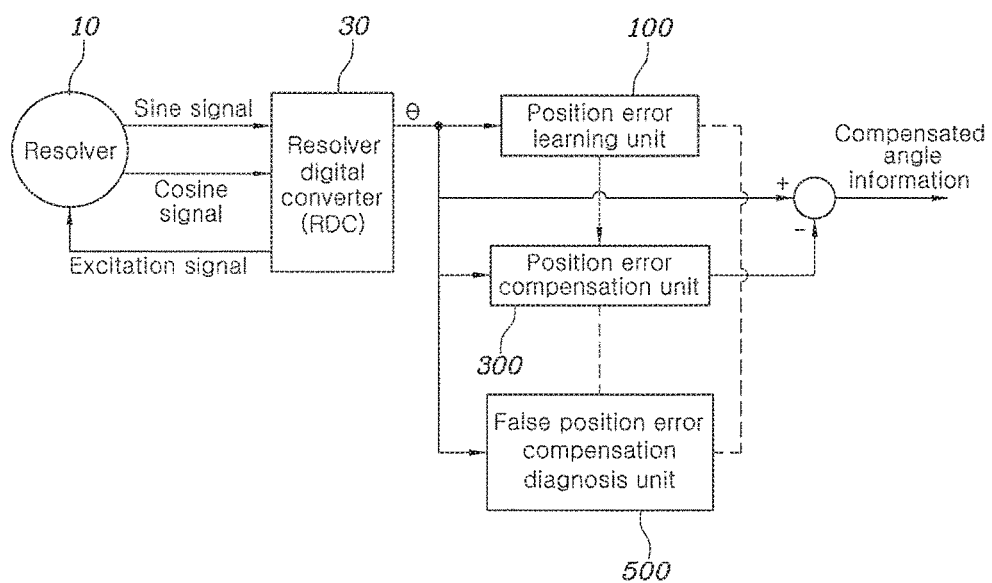
FIG. 2 is a configuration diagram of a resolver position error compensation apparatus according to an embodiment of the present disclosure.
Figure 3:
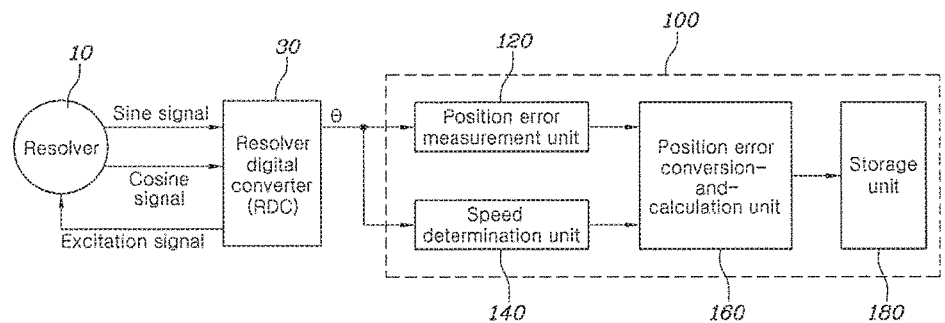
FIG. 3 is a configuration diagram for explaining a position error learning unit of a resolver position error compensation apparatus according to an embodiment of the present disclosure.

FIG. 1 is a block diagram of an Angle Tracking Observer (ATO) included in a resolver digital converter according to an embodiment of the present disclosure, FIG. 2 is a configuration diagram of a resolver position error compensation apparatus according to an embodiment of the present disclosure, and FIG. 3 is a configuration diagram for explaining a position error learning unit of a resolver position error compensation apparatus according to an embodiment of the present disclosure.

Figure 4:
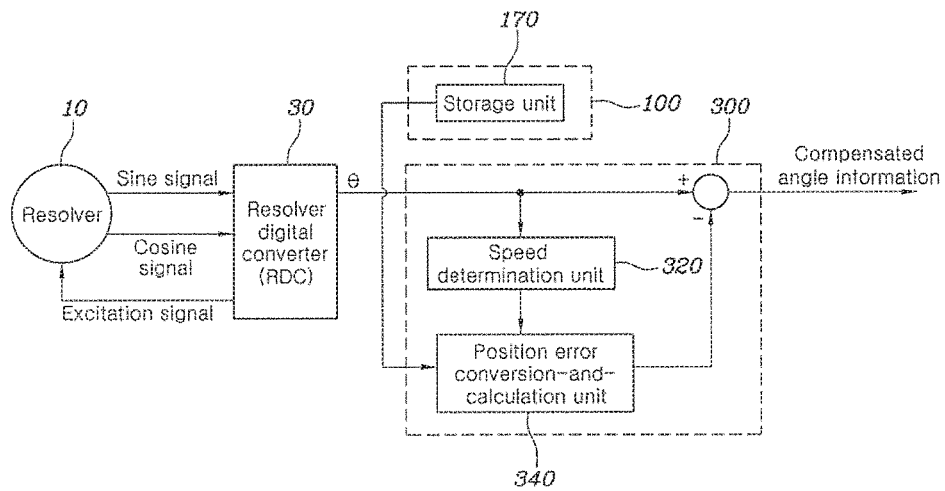
FIG. 4 is a configuration diagram for explaining a position error compensation unit of a resolver position error compensation apparatus according to an embodiment of the present disclosure.
Figure 5:
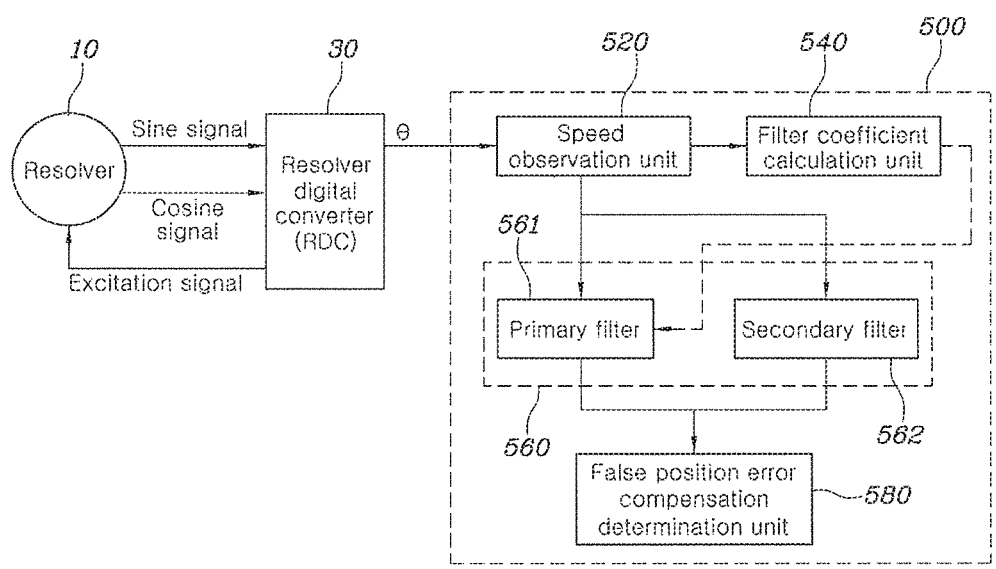
FIG. 5 is a configuration diagram for explaining a false position error compensation diagnosis unit of a resolver position error compensation apparatus according to an embodiment of the present disclosure.

FIG. 4 is a configuration diagram for explaining a position error compensation unit of a resolver position error compensation apparatus according to an embodiment of the present disclosure, and FIG. 5 is a configuration diagram for explaining a false position error compensation diagnosis unit of a resolver position error compensation apparatus according to an embodiment of the present disclosure.

First, FIG. 1 shows an Angle Tracking Observer (hereinafter, referred to as ATO) that receives sine and cosine signals, which are position information of a rotor of a motor, which is detected by a resolver, and calculates each piece of information. The ATO may be designed in various methods, and various frequency response characteristics of the ATO may be implemented according to a design method and a gain. The actual resolver position errors recognized by a microcomputer are recognized differently for each speed depends on internal ATO characteristics, such as the function of a resolver digital converter (RDC) chip implemented in hardware or the function of a resolver digital converter implemented in software. As a result, a position error component measured at a specific speed cannot be used for compensation at another speed. Therefore, the present disclosure aims to improve reliability and stability by compensating for a position error in a full speed range on the basis of a position error measured at a specific speed, and determining the possibility of false compensation for the current position error through the diagnosis of position error components after performing compensation.

Referring to FIG. 2, an apparatus for compensating for a position error of a resolver according to an embodiment of the present disclosure may include: a position error learning unit 100 that receives position information of a rotor of a motor, which is detected by a resolver 10, to measure a position error, converts the measured position error to a position error at an electrical angular velocity of 0, and stores the converted position error; a position error compensation unit 300 that receives a current electrical angular velocity and a position error stored in the position error learning unit 100, converts the received current electrical angular velocity and position error to a position error at the current electrical angular velocity, and compensates for the converted position error; and a false position error compensation diagnosis unit 500 that makes a determination of position error compensation when the magnitude of a ripple at an electrical angular velocity, which is measured after the position error has been compensated for by the position error compensation unit 300, is equal to or greater than a predetermined reference magnitude.

Hereinafter, with reference to FIGS. 3 to 5, each of the position error learning unit 100, the position error compensation unit 300, and the false position error compensation diagnosis unit 500 will be described.

Referring to FIG. 3, the position error learning unit 100 may include: a position error measurement unit 120 that receives position information of a rotor of a motor, which is detected by the resolver 10, to measure a position error; a speed determination unit 140 that determines the electrical angular velocity of the position error measured by the position error measurement unit 120; and a position error conversion-and-calculation unit 160 that converts the position error to a position error at an electrical angular velocity of 0, on the basis of information which is derived by configuring the electrical angular velocity determined by the speed determination unit 140 as a previously prepared and stored mapping data input, and the position error measured by the position error measurement unit 120; and a storage unit 180 that stores the position error converted by the position error conversion-and-calculation unit 160.

Here, the position error measurement unit 120 receives, from a resolver digital converter which digitally converts position information of a rotor of a motor, which is measured by the resolver 10, and outputs the digitally converted position information, the digitally converted position information of the rotor of the motor, and measures a position error. The position error may include various components, and various measurement methods are possible. In the present disclosure, a position error, which is measured irrespective of the position error measurement method, may be replaced by the following form according to a period of the electrical angular frequency.

$$\text{Position error component} = \sum_{0}^{\infty} M_N \cos(N\omega t - \phi_N)$$

Here, $M_N$ is a magnitude of the amplitude of the Nth position error component, and $\phi_N$ is a phase of the Nth position error component. $\omega$ is an electrical angular velocity and is obtained by sorting orders based on an electrical angle period, so that the value of N may not be an integer. For example, when a position error of a 4th machine angle exists and a six-pole pair resolver is used, $\omega$ becomes 4/6.

$M_N$ and $\phi_N$ are components that vary depending on the electrical angular frequency (or electrical angular velocity) according to an ATO design inside the resolver digital converter 30 chip or a software-implemented resolver digital converter 30. That is, the present disclosure aims to improve reliability and stability by compensating for a position error in a full speed range based on a position error measured at a specific speed by compensating for $M_N$ and $\phi_N$ which vary depending on an electrical angular frequency (or electrical angular velocity), and determining the possibility of false compensation for the current position error through the diagnosis of position error components after performing compensation, thereby improving reliability and stability.

The amplitude and phase ($M_N$ and $\phi_N$) of the position error, which vary depending on speed, may be used to calculate a Bode plot based on the structure of the ATO and a gain applied thereto, and may be used to output the ATO amplitude ratio and the ATO phase difference by configuring the amplitude and phase ($M_N$ and $\phi_N$) as mapping data in advance and receiving an input of electrical angular velocity $\omega$ on the basis of a map. Here, the ATO amplitude ratio and the ATO phase difference are an amplitude ratio and a phase difference, which are changed in the corresponding Nth electrical angular velocity with reference to the electrical angular velocity of 0.

The Nth position error component at a specific electrical angular velocity $\omega_{target}$ may be measured by the position error measurement unit 120 as follows.

$$M_{N@N\omega_{target}} \cos(N\omega_{target} t - \phi_{N@N\omega_{target}})$$

$M_{N@N\omega_{target}}$, $\phi_{N@N\omega_{target}}$ is an amplitude and phase of the Nth position error component at a specific electrical angular velocity.

The speed determination unit 140 determines an electrical angular velocity of the position error measured by the position error measurement unit 120.

The position error conversion-and-calculation unit 160 converts the position error to a position error at an electrical angular velocity of 0, on the basis of the position error measured by the position error measurement unit 120 and the ATO amplitude ratio and the ATO phase difference, which are information derived by configuring the electrical angular velocity determined by the speed determination unit 140 as a previously prepared and stored mapping data input. The mathematical expression is as follows.

$$M_{N@electrical\ angular\ velocity\ of\ 0} = \frac{M_{N@N\omega_{target}}}{ATO\ \text{amplitude ratio}_{@N\omega_{target}}}$$

$$\phi_{N@\ electrical\ angular\ velocity\ of\ 0} = \phi_{N@N\omega_{target}} - ATO\ \text{phase difference}_{@N\omega_{target}}$$

Here, the physical meaning of the Nth position error component value at the converted electrical angular velocity of 0 is position error components of a resolver and various circuits before passing through the ATO.

The storage unit 180 stores the position error at the electrical angular velocity of 0, which is converted by the position error conversion-and-calculation unit 160. Based on the stored data, a position error compensation unit 300, which will be described later, performs error compensation.

Referring to FIG. 4, the position error compensation unit 300 may include: a speed determination unit 320 that determines a current electrical angular velocity; and a position error conversion unit 340 that receives the current electrical angular velocity determined by the speed determination unit 320 and the position error stored in the position error learning unit 100 and converts the received current electrical angular velocity and position error to a position error at the current electrical angular velocity.

Here, the speed determination unit 320 determines the current electrical angular velocity.

The position error conversion unit 340 receives the current electrical angular velocity determined by the speed determination unit 320 and the position error stored in the storage unit 170 of the position error learning unit 100 and converts the received current electrical angular velocity and position error to a position error at the current electrical angular velocity. Specifically, a method for performing conversion to the Nth position error at the current electrical angular velocity is as follows.

$$M_{N@N\omega} = \text{stored } M_{N@ \text{ electrical angular velocity of } 0} * \text{ATO amplitude ratio}_{@N\omega}$$

$$\varphi_{N@N\omega} = \text{stored } \varphi_{N@ \text{ electrical angular velocity of } 0} + \text{ATO phase difference}_{@N\omega}$$

Thus, the Nth position error is calculated as follows. Nth position error at electrical angular velocity of w=stored $M_{N@electrical\ angular\ velocity\ of\ 0}$*ATO amplitude ratio$_{@N\omega}$ cos (N$\omega$t−(stored $\varphi_{N@electrical\ angular\ velocity\ of\ 0}$+ATO phase difference$_{@N\omega}$))

When the position error calculated in the manner described above is compensated for, it is possible to compensate for position error throughout a full speed range.

Referring to FIG. 5, the false position error compensation diagnosis unit 500 may include: a speed observation unit 520 that measures an electrical angular velocity after the position error compensation is performed by the position error compensation unit 300; a filter coefficient calculation unit 540 that calculates a filter coefficient according to the electrical angular velocity measured by the speed observation unit 520; a filter unit 560 that extracts a ripple at the electrical angular velocity; and a false position error compensation determination unit 580 that makes a determination of false position error compensation when a magnitude of the extracted ripple is equal to or greater than a reference magnitude.

Here, the false position error compensation diagnosis unit 500 is configured to diagnose whether the position error learned by the position error compensation unit 300 is applied normally. When the position error is learned normally, a primary component and a secondary component, which are present at the speed after performing the position error compensation, should be reduced. However, when an abnormal signal is instantaneously applied to a circuit during position error compensation learning, with the result that a false value is learned, the primary and secondary components may not be reduced for a reason such as a case where a position error compensation value has changed from a position error compensation value at the time of learning due to a hardware problem or the influence of temperature. The present disclosure may compensate for a position error throughout a full speed range based on a position error measured at a specific speed, and further determines the possibility of false compensation for the current position error through the diagnosis of position error components after performing compensation, thereby improving reliability and stability.

The false position error compensation diagnosis unit 500 may include a speed observation unit 520, a filter coefficient calculation unit 540, a filter unit 560, and a false position error compensation determination unit 580.

Here, the speed observation unit 520, which is configured to measure an electrical angular velocity after the position error compensation is performed by the position error compensation unit 300, may be a differentiator.

The filter coefficient calculation unit 540 calculates a filter coefficient of a filter unit 560 according to the electrical angular velocity measured by the speed observation unit 520. The filter unit 560, which will be described later, may include a primary filter and a secondary filter, and the filter coefficient calculation unit 540 calculates filter coefficients to be applied to the primary filter and the secondary filter for speed filtering.

The filter unit 560 may be a band-pass filter for extracting a ripple component of an electrical angular velocity. Further, the filter unit 560 may include a primary filter and a secondary filter, and the primary filter and the secondary filter may extract a primary speed ripple component of an electrical angle and a secondary speed ripple component of an electrical angle, respectively.

The false position error compensation determination unit 580 receives a primary speed ripple component of an electrical angular frequency and a secondary speed ripple component of an electrical angular frequency, which are extracted at the current speed, and makes a determination of false position error compensation when each of the magnitudes of the corresponding speed ripples is equal to or greater than a predetermined reference magnitude. Here, the reference magnitude is a value that may be variously set.

As an embodiment of the present disclosure, a method for determining false position error compensation may include a method of comparing a root mean square (RMS) value of a ripple at an electrical angular velocity, which is measured after the position error has been compensated for, with a predetermined reference value, as well as the above-described method, which compares the ripple magnitude with the reference magnitude.

Specifically, when the measured RMS value of the ripple at the electrical angular velocity is equal to or greater than a predetermined reference value, a determination of false position error compensation is made. Here, the reference value is a value that may be variously set.

When the determination of false position error compensation is made, the false position error compensation diagnosis unit 500 may initialize the position error stored in the position error learning unit 100, or may re-perform a process of converting the position error measured by the position error learning unit 100 to a position error at an electrical angular velocity of 0 and storing the converted position error.

Here, in the case where a process of converting the position error measured by the position error learning unit 100 to a position error at an electrical angular velocity of 0 and storing the converted position error is re-performed because it is determined to be false position error compensation, the process may be re-performed without compensating for the position error derived by the position error compensation unit. According to the present disclosure, various operations are possible other than the initialization and re-performance of the operation described above after the false compensation determination is made by the false position error compensation determination unit 580.

A method for compensating for a position error of a resolver according to an embodiment of the present disclosure may include: measuring position information of a rotor of a motor, receiving the measured position information of the rotor of the motor to measure a position error, converting the measured position error to a position error at an electrical angular velocity of 0, and storing the converted position error; receiving a current electrical angular velocity and the stored position error, converting the received current electrical angular velocity and position error to a position error at the current electrical angular velocity, and compensating for the converted position error; and making a determination of false position error compensation when the magnitude of a ripple at an electrical angular velocity, which is measured after the position error has been compensated for, is equal to or greater than a predetermined reference magnitude.

A method for compensating for a position error of a resolver according to the present disclosure may include: measuring position information of a rotor of a motor, receiving the measured position information of the rotor of the motor to measure a position error, converting the measured position error to a position error at an electrical angular velocity of 0, and storing the converted position error; receiving a current electrical angular velocity and the stored position error, converting the received current electrical angular velocity and position error to a position error at the current electrical angular velocity, and compensating for the converted position error; and making a determination of false position error compensation when a root mean square value of a ripple at an electrical angular velocity, which is measured after the position error has been compensated for, is equal to or greater than a predetermined reference value.

Making the determination of false position error compensation further includes, when the determination of false position error compensation is made, initialization of the stored position error or re-performing a process of converting the position error measured by the position error learning unit to a position error at an electrical angular velocity of 0 and storing the converted position error.

The method for compensating for a position error of a resolver includes the same operation as that performed by each of the position error learning unit 100, the position error compensation unit 300, and the false position error compensation diagnosis unit 500, which are elements of the resolver position error compensation apparatus described above, and thus a description of each step will be omitted.

In various embodiments, the apparatus for compensating for a position error of a resolver includes a controller such as an electronic control unit (ECU) that includes the above-described devices including a position error learning unit, a position error compensating unit, etc., or they are embedded in the controller.

A particular embodiment of the present disclosure has been illustrated and described, but various changes and modifications will be obvious to a person ordinarily skilled in the art without departing from the technical idea of the present disclosure, provided by the following claims.

What is claimed is:

1. An apparatus for compensating for a position error of a resolver, the apparatus comprising a controller which is configured to:
   receive position information of a rotor of a motor, which is detected by the resolver, to measure a first position error, convert the first position error to a second position error at an electrical angular velocity of 0, and to store the second position error;
   receive a current electrical angular velocity and the second position error, convert the second position error to a third position error at the current electrical angular velocity, and compensate for the third position error; and
   perform determination of false position error compensation when a magnitude of a ripple at an electrical angular velocity, which is measured after the third position error has been compensated for, is equal to or greater than a reference magnitude.

2. The apparatus of claim 1, wherein the controller is further configured to:
   receive the position information of the rotor of the motor, which is detected by the resolver, to measure a fourth position error;
   determine an electrical angular velocity of the fourth position error; and
   convert the fourth position error to a fifth position error at the electrical angular velocity of 0, based on information which is derived by configuring the electrical angular velocity, as a previously prepared and stored mapping data input, and the fifth position error; and
   store the fifth position error.

3. The apparatus of claim 1, wherein the controller is further configured to:
   determine a current electrical angular velocity; and
   receive the current electrical angular velocity and the second position error, and convert the second position error at the current electrical angular velocity.

4. The apparatus of claim 1, wherein the controller includes:
   a speed sensor that measures an electrical angular velocity after the third position error is compensated for,
   wherein the controller is further configured to:
   calculate a filter coefficient according to the electrical angular velocity measured by the speed sensor;
   extract the ripple at the electrical angular velocity; and
   performs a determination of false position error compensation when a magnitude of the extracted ripple is equal to or greater than the reference magnitude.

5. The apparatus of claim 4, wherein, when the false position error compensation is determined, the controller initializes the third position error or re-performs a process of converting the third position error to a sixth position error at the electrical angular velocity of 0 and storing the sixth position error.

6. The apparatus of claim 1, further comprising a resolver digital converter that digitally converts the position information of the rotor of the motor, which is measured by the resolver, and outputs the converted position information.

7. An apparatus for compensating for a position error of a resolver, the apparatus comprising a controller configured to:
   receive position information of a rotor of a motor, which is detected by the resolver, to measure a first position error, convert the measured position error to a second position error at an electrical angular velocity of 0, and to store the second position error;
   to receive a current electrical angular velocity and the second position error, convert to a third position error at the current electrical angular velocity, and compensates for the third position error; and
   perform a determination of false position error compensation when a root mean square (rms) value of a ripple at an electrical angular velocity, which is measured after the third position error has been compensated for, is equal to or greater than a reference value.

8. The apparatus of claim 7, wherein, when the false position error compensation is determined, the controller initializes the second position error or re-performs a process of converting the first position error to a fourth position error at the electrical angular velocity of 0 and storing the fourth position error.

9. The apparatus of claim 7, further comprising a resolver digital converter that digitally converts the position information of the rotor of the motor, which is measured by the resolver, and outputs the converted position information.

10. A method for compensating for a position error of a resolver, the method comprising steps of:
    measuring, by the resolver, position information of a rotor of a motor, receiving, by a controller, the measured position information of the rotor of the motor to measure a first position error, converting, by the controller, the first position error to a second position error at an electrical angular velocity of 0, and storing, by the controller, the second position error;

receiving, by the controller, a current electrical angular velocity and the second position error, performing, by the controller, conversion to a third position error at the current electrical angular velocity, and compensating, by the controller, for the third position error; and performing, by the controller, a determination of false position error compensation when a magnitude of a ripple at an electrical angular velocity, which is measured after the third position error has been compensated for, is equal to or greater than a reference magnitude.

11. The method of claim 10, wherein, when the false position error compensation is determined, the step of performing the determination comprises initializing the second position error or re-performing a process of converting the first position error to a fourth position error at the electrical angular velocity of 0 and storing the fourth position error.

12. A method for compensating for a position error of a resolver, the method comprising steps of:

measuring, by the resolver, position information of a rotor of a motor, receiving, by a controller, the measured position information of the rotor of the motor to measure a first position error, converting, by the controller, the first position error to a second position error at an electrical angular velocity of 0, and storing, by the controller, the second position error;

receiving, by the controller, a current electrical angular velocity and the second position error, performing, by the controller, conversion to a third position error at the current electrical angular velocity, and compensating, by the controller, for the third position error; and performing, by the controller, a determination of false position error compensation when a root mean square value of a ripple at an electrical angular velocity, which is measured after the third position error has been compensated for, is equal to or greater than a reference value.

13. The method of claim 12, wherein, when the false position error compensation is determined, the step of performing determination comprises initializing the second position error or re-performing a process of converting the fourth position error to a third position error at an electrical angular velocity of 0 and storing the fourth position error.

* * * * *